United States Patent [19]
Goldman

[11] Patent Number: 4,675,669
[45] Date of Patent: Jun. 23, 1987

[54] SYSTEM OF ISSUING SECURE DOCUMENTS OF VARIOUS DENOMINATION

[75] Inventor: Robert N. Goldman, Honolulu, Hi.

[73] Assignee: Light Signatures, Inc., Los Angeles, Calif.

[21] Appl. No.: 754,498

[22] Filed: Jul. 11, 1985

Related U.S. Application Data

[60] Continuation-in-part of Ser. No. 623,654, Jun. 22, 1984, Pat. No. 4,546,352, which is a division of Ser. No. 492,324, Jun. 3, 1983, Pat. No. 4,489,318, which is a division of Ser. No. 276,282, Jun. 22, 1981, Pat. No. 4,423,415, which is a continuation-in-part of Ser. No. 161,838, Jun. 23, 1980, abandoned.

[30] Foreign Application Priority Data

Aug. 3, 1983 [CA] Canada .................................... 433839

[51] Int. Cl.⁴ .......................... H04Q 9/00; G06K 5/00
[52] U.S. Cl. ............................... 340/825.34; 235/380; 235/487; 283/72; 283/58
[58] Field of Search ................... 283/58, 901, 904, 72; 356/71; 382/7, 50; 340/825.34, 825.3; 235/487, 380, 491

[56] References Cited

U.S. PATENT DOCUMENTS

| | | | |
|---|---|---|---|
| 2,285,806 | 6/1942 | Close | 283/72 |
| 4,423,415 | 12/1983 | Goldman | 340/825.34 |
| 4,450,348 | 5/1984 | Stockburger et al. | 235/380 |
| 4,476,468 | 10/1984 | Goldman | 340/825.34 |
| 4,546,352 | 10/1985 | Goldman | 340/825.34 |

FOREIGN PATENT DOCUMENTS 569333 11/1975 Switzerland .

Primary Examiner—Donald J. Yusko
Attorney, Agent, or Firm—Nilsson, Robbins, Dalgarn, Berliner, Carson & Wurst

[57] ABSTRACT

A system of issuing secure docments involving stages that may be substantially distinct both in time and space. A raw document is selected possessing a uniqueness characteristic which is sensed and coded on the document. Subsequently, the document is completed as with an individual designation of value, by providing a bar code in the area of the uniqueness characteristic which is related to an Arabic numeral designation. Apparatus processes such documents for creation and verification based on selective testing of the uniqueness characteristic and the designations.

12 Claims, 5 Drawing Figures

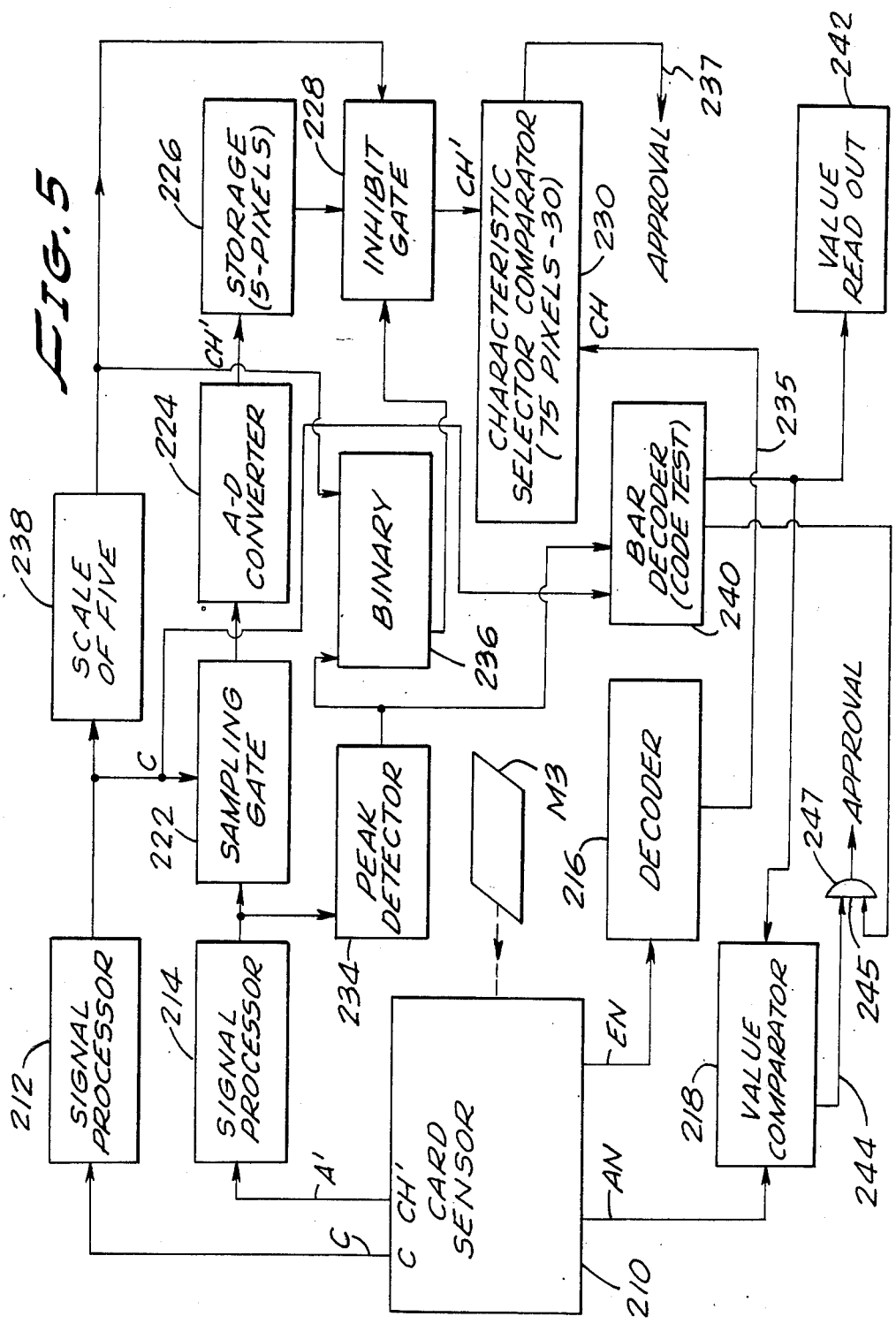

SYSTEM OF ISSUING SECURE DOCUMENTS OF VARIOUS DENOMINATION

RELATED SUBJECT MATTER

This is a continuation-in-part of an application Ser. No. 623,654, filed June 22, 1984, entitled "Non-Counterfeitable Document System", now U.S. Pat. No. 4,546,352; which was a divisional of Ser. No. 06/492,324, now U.S. Pat. No. 4,489,318, entitled "Non-Counterfeitable Document System", issued Dec. 18, 1984, and filed June 3, 1983; which was a divisional of Ser. No. 06/276,282, and now U.S. Pat. No. 4,423,415, entitled "Non-Counterfeitable Document System", issued Dec. 27, 1983, filed June 22, 1981; which in turn was a continuation-in-part of an application Ser. No. 06/161,838, filed June 23, 1980, entitled "Non-Counterfeitable Document System", now abandoned.

BACKGROUND AND SUMMARY OF THE INVENTION

In the field of commercial transactions, the need frequently arises for a document that is stable in the sense of being exceedingly difficult to alter or copy. For example, a host of techniques have been proposed in the past for secure checks, money orders and other documents seeking to minimize the risk of modification or counterfeit duplication.

Traditionally, financial documents such as checks involve a preparation process constituting several distinct steps. For example, the paper for a check or money order might first be printed with a background pattern to resist erasures. Next, the document may be printed with a format including certain identification material, for example naming the issuing bank or other organization. Blank check forms completed to that stage are traditionally held for individual use.

The steps of actually issuing a document as in the form of a check, involve printing the name of the initial payee along with a designation of value, then applying a validating mark, e.g. signature. When so completed, the document in the form of a check or money order is delivered to a holder and then is subject to his absolute control. In sequence, several different people may have unrestricted control of the document. Consequently, there is a considerable danger in exposing such documents to alteration or counter copying. Accordingly, a need exists for a document system to process stable secure documents, that are difficult to alter or counterfeit. Such a system could find widespread application for the multiple-stage preparation and verification of various financial documents.

In recent years, there has been substantial progress in the development of anticounterfeit documents. For example, U.S. Pat. No. 4,423,415, related hereto, discloses an anticounterfeit document that can be formed of ordinary bond paper. The patent discloses the utilization of the inherent uniqueness characteristic pattern of such paper as a basis for positive identification. Essentially, the uniqueness characteristic at a specific location of the document verifies identification and, accordingly, authenticity.

Other uniqueness characteristics also have been proposed for combating counterfeit reproductions. However, a need continues to exist for a system as for use with checks or money orders, which documents are mass-produced to a certain stage of preparation, then completed substantially on an individual basis.

In general, the present invention is directed to a system for processing documents which are difficult if not impractical to effectively counterfeit or alter. More specifically, the system involves documents that are prepared in stages with the initial preparation involving a volume operation whereas final preparation involves individual documents.

In accordance with the system of the present invention, document material is selected to possess a uniqueness characteristic that is sensitive to change, as by erasure. Forms may then be printed using such a material. During such operations, individual document forms are sensed to provide data indicative of the uniqueness characteristic at a select area. That data is made of record as by recording it on the document.

After the preliminary preparation, a form or blank document is completed as by recording designations on the document to indicate value and validity. In accordance herewith, the value designations are placed in the area of the uniqueness characteristic that is of concern and may use a code format. The system contemplates the verification of such documents by comparing select portions of the uniqueness characteristic area and selectively eliminating from such comparison those spaces which bear the applied designations as of value.

BRIEF DESCRIPTION OF THE DRAWINGS

In the drawings, which constitute a part of this specification, exemplary embodiments of the invention are set forth as follows:

FIG. 5 is a block diagram of a system in accordance with the present invention for verifying a document as illustrated in FIG. 1.

DESCRIPTION OF THE ILLUSTRATIVE EMBODIMENT

As indicated above, a detailed illustrative embodiment of the present invention is disclosed herein. However, physical media, data formats, and operating apparatus structured in accordance with the present invention may be embodied in a wide variety of forms, some of which may be quite different from those of the enclosed embodiment. Consequently, the specific structural and functional details disclosed herein are merely representative; yet in that regard, they are deemed to afford the best embodiment for purposes of disclosure and to provide a basis for the claims herein which define the scope of the present invention.

Figure 1:
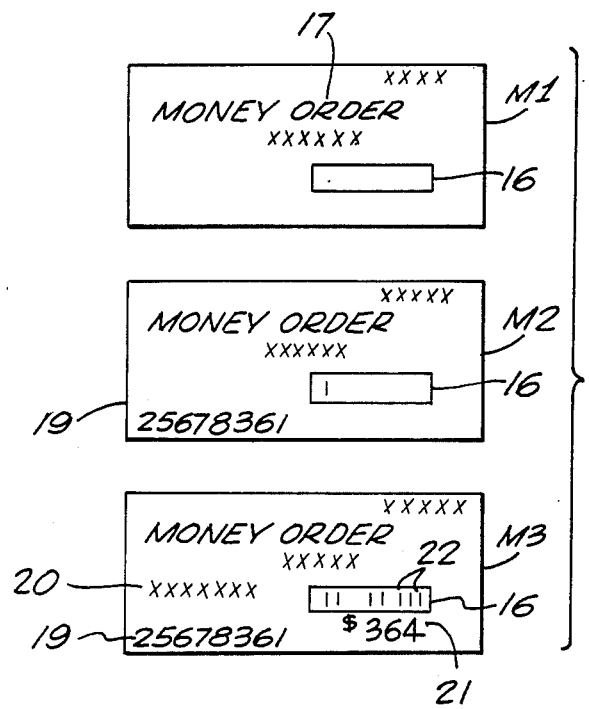
FIG. 1 is a plan view illustrating a process of preparing a document in accordance herewith.

Referring initially to FIG. 1, preparation of a secured document in accordance herewith is illustrated in three separate stages. For purposes of example, the document constitutes a money order proposed for use in accordance with the procedures widely practiced in association with such documents. In accordance with the present invention, a form or raw document M1 may simply consist of a sheet of stiff paper or cardboard, printed with certain basic uniform information. Generally, in accordance with the present invention, the blank or raw document M1 possesses a uniqueness characteristic which can be sensed and reduced to signal-represented data. It is desirable that the uniqueness characteristic reveal alteration of the document. For example, erasing a sheet of paper alters the translucency characteristic of the paper in the location of the erasure. While the document may be of uniform material, e.g. bond paper, on the raw document M1, a block 16 defines a critical area possessing the uniqueness characteristic. Also, the document M1 is printed with certain form marking in addition to the block 16 including identification indicia 17. Note also that an erasure-sensitive pattern may be printed on the document to emphasize change in the uniqueness characteristic.

As described in detail below, further processing converts the document M1 to a document M2. The uniqueness characteristic of the document M2 (within the block 16) has been sensed, reduced to numerical data, and printed on the document M2 in the form of characteristic indicia 19. Documents M2 may be produced from the documents M1 in mass in accordance herewith and distributed to operating locations. With respect to money orders of the disclosed embodiment, processed documents M2 would be delivered to stations from which money orders are issued. Note that as a result of their uniqueness characteristic, the documents M2 are capable of individual identification with the consequence that counterfeiting is exceedingly difficult, particularly if encryption techniques are employed in forming the indicia 19.

Drawing from a supply of processed documents M2, final documents M3 are prepared and issued. Specifically, value designations are placed on the card M3 along with validation indicia 20. Various formats may be used as the validation data 20, for example a designation of the payee and a signature on behalf of the issuing organization. In the disclosed embodiment, the value designations take two specific forms, an Arabic value designation 21 and vertical bar designation 22 in the block 16. The bar designations 22 are position coded to designate a value coinciding to the value represented by the Arabic designation 21, e.g. $364.00. The position code of the bar designations 22 is treated in detail below.

Final documents M3 are released to the control of a payee or purchaser. Consequently, each document is accessible for alteration or duplication, either of which might defraud the issuing organization. As explained in greater detail below, the document M3 is difficult to counterfeit because of its form and structure. The document M3 is uniquely identified by coincidence between the data of characteristic indicia 19 and the data of the uniqueness characteristic that can be sensed from within the block 16.

The bar designations 22 resist undetectable modification because of their location in the block 16 and their consistent distribution. That is, alteration as by erasure, bleaching or overlays will change the uniqueness characteristic in the block 16.

In accordance herewith, the block 16 is indexed with respect to the bar designations 22. Sub-areas within the block 16 which contain bar designations 22 are eliminated selectively from the comparison to verify the authenticity of the document M3. In that regard, the precise placement and consistency of the bar designations 22 are not critical. The designations 22 might be satisfactorily placed on the document by hand.

Figure 2:
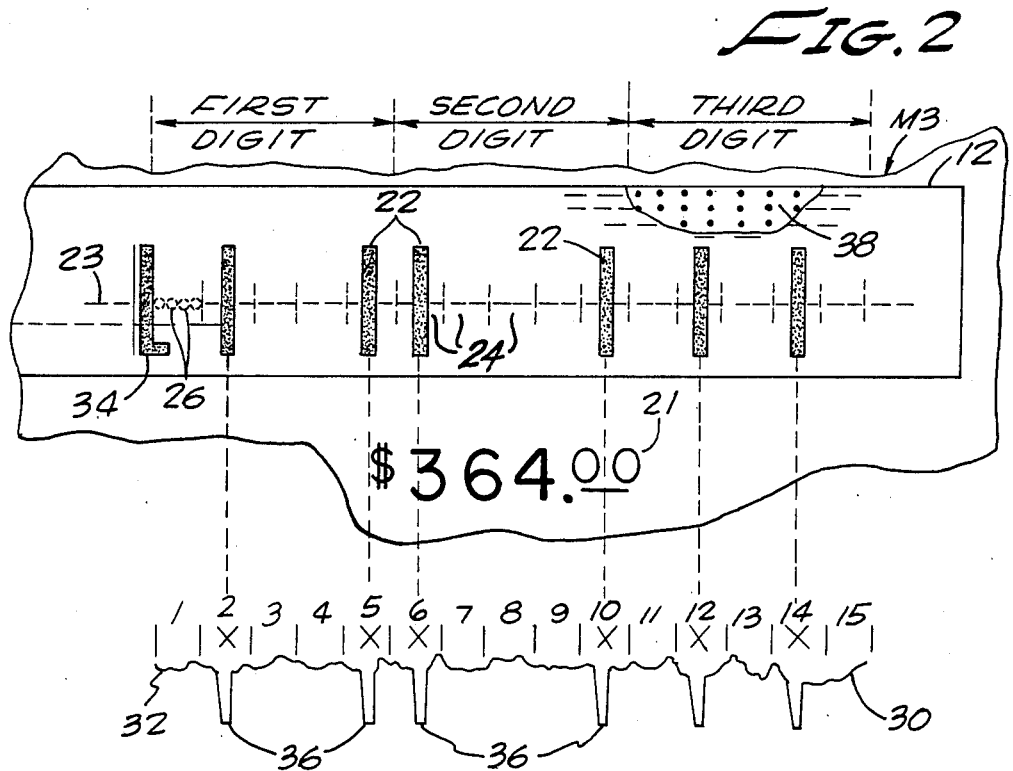
FIG. 2 is a fragmentary enlarged view of a portion of a document as illustrated in FIG. 1 correlated to a waveform.

An enlarged portion of the document M3 is shown in FIG. 2 illustrating the block 16 in greater detail. Within the block 16, a horizontal line 23 indicates the sensing path. The line 26 is segmented into sections 24. In the sensing operation, the line 23 is scanned to sense individual pixel locations 26. Note that there are five pixel locations 26 in each of the sections 24. Also note that within the block 16, neither the line 23, the sections 24, nor the pixel locations 26 are defined by any visible marking. Rather, these alignments are accomplished by indexing the scan of the line 22 on the basis of linear displacement in relation to the block 16.

As indicated above, document substance in the block 16 (FIG. 2) has a uniqueness characteristic that is machine sensible and somewhat sensitive to change as by erasure. As indicated above, the document may comprise a sheet of ordinary stiff paper with the uniqueness characteristic being the inherent pattern of translucency in such a sheet. It is noteworthy that such patterns of variation are apparent in various papers simply by exposing the sheet to back lighting. Generally, such patterns are altered, as for example by adding printing, erasing, overlaying, bleaching and so on; however, the characteristic pattern of the medium is not duplicable with a practical level of effort.

It has been previously recognized that various forms of indicia, e.g., marking, may be applied to modify the transparency of a document and that such markings may be secured by a record of the composite translucency. In that regard, see the above-referenced, related U.S. Pat. No. 4,423,415 which teaches the use of indicia along with substance translucency as a basis for verifying that a document has not been altered.

The system of the present invention is distinct from the related patent in that it recognizes the frequent need to place value designations on form documents after they have been batch processed and coded with respect to an anticounterfeit characteristic. In general, the system of the present invention is based on recognizing that the anticounterfeit uniqueness characteristic may be integrally associated with opaque designations placed on the document after it is coded, provided that portions of the uniqueness characteristic data are selectively ignored.

As indicated above, the uniqueness characteristic of the document M3 in the block 16 is sensed as a series of pixel locations 26 along a line 23. As described in detail below, the sensing may be accomplished by a variety of scanning techniques, as for example where areas of the pixel locations 26 are defined by a photosensing window. Thus, the document M3 is moved in relation to the window to accomplish the scanning. Accordingly, sensing the pixel locations 26 involves scanning the line 23 to produce an analog signal that is sampled at periodic intervals. The scanning operation is illustrated in FIG. 2. Specifically, scan sensing the line 23 provides an analog signal somewhat as represented by the curve 30 in FIG. 2. Generally, such a curve is repeatable in that each time the line 23 is scanned for translucency, a similar curve 30 is produced The curve 30 is space related to the block 16 of the document M3. Note that the starting point 32 on the curve 30 aligns with the trailing edge of a start bar 34 preceded by a thin line 35 and printed in the box 16 (extreme left).

From the beginning point 32, the curve varies in accordance with the translucency of the document M3 along the line 23; however, note that at each of the solid opaque bar designations 22, the curve drops to a "black" level as indicated by the analog signal spikes 36. The spikes 36 each indicate that the signal portion within the containing section 24 is to be ignored. An example will illustrate the operation.

In FIG. 2, the sections 24 are space related to segments of curve 30 and the segments are designated and numbered in sequence from 1 to 15. The segment 2 of the curve 30 includes a spike 36. Consequently, the pixel areas 26 in the space-related section 24 (aligned with the segment 2) are eliminated from the verification comparison. Similarly, the sections 5, 6, 10, 12, and 14 also contain a spike 36 and accordingly are eliminated from the comparison. Conversely, the sections or spaces 1, 3, 4, 7, 8, 9, 11, 13, and 15 do not contain a spike 36. Consequently, pixel locations 26 in their associated sub-areas 24 are tested during the verification. Also, note that each series of five sub-areas (defining a digit) contains two designations 22.

The system of the present invention may now be best understood by considering the process and structures involved in the development and use of the document 3 as it is depicted in FIGS. 1 and 2. Initially, a sheet material is selected having a uniqueness characteristic capable of machine sensing for individual identification. Furthermore, for certain applications it is important that the sheet material is sensitive to erasures or other efforts at alteration in that such manipulation will modify the uniqueness characteristic. As indicated above, an exemplary form of material is paper.

The sheet material is provided in units of a convenient size, for example, that traditionally used for money orders or checks. Using conventional production techniques, the format of the raw document M1 may be printed on stock material either before or after cutting individual units.

The form sheets may be printed with a background design 38 as illustrated in FIG. 2 as in the form of nonuniformly spaced dots. As indicated above, depending on the color, density, and so on, the design 38 may make the document M3 more sensitive to modification with regard to the uniqueness characteristic, e.g. translucency. The design 38 may be subtle to the eye. and limited to specific areas of the document as within the block 38.

Individual raw documents M1 are provided with the requisite uniqueness characteristic and printed with form indicia including the block 16 and the identification indicia 17. Documents in such a form are then processed to sense the uniqueness characteristic within the block 16 and record representative indications 19 on the document as shown on the processed document M2 (FIG. 1). An illustrative apparatus for performing such a function is shown in FIG. 3 and will now be considered.

Figure 3:
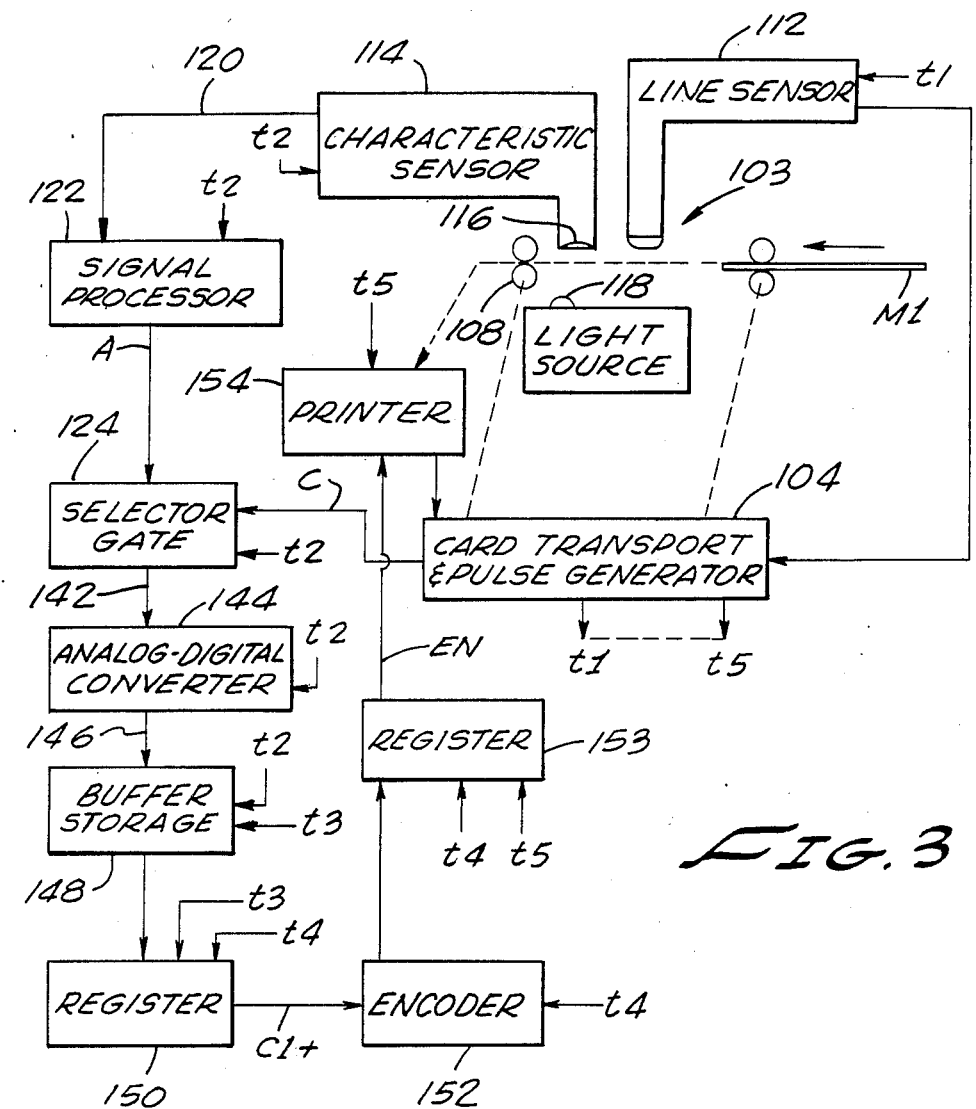
FIG. 3 is a block diagram of a system in accordance with the present invention for initially preparing a document as illustrated in FIG. 1.

A raw document M1 is illustrated in FIG. 3 (upper right) entering the apparatus. The document is moved by a transport mechanism 103 that is incorporated with a transport and pulse generator 104. Specifically, the generator 104 is connected to roller pairs 106 and 108 in the mechanism 103. The presence of a document is detected, as well known in the art, by actuating the mechanism 103 to move the document M1 from right to left in relation to devices for dynamic sensing.

Traveling from the roller pair 106 to the roller pair 108, the document M1 passes a pair of optical sensors. Initially, a line sensor 112 detects the start bar 34 on the document (FIG. 2) indicating the beginning of the area where the uniqueness characteristic is to be measured. The line sensor 112 (FIG. 3) senses the point from which clock pulses are provided by the generator 104 to index the line 23 into pixel locations 26 (FIG. 2).

Leaving the line sensor 112 (FIG. 2), the document M1 moves under a characteristic translucency sensor 114 that scans the line 23 by reference to an edge guide or to a horizontal line of the block 16 as well known in the art. The characteristic sensor 114 may incorporate a single photo cell 116 or a bank of photo cells as well known in the prior art to accomplish scanning a path along the line 23. Note that a light source 118 provides the illumination for penetrating the document M1 to indicate its translucency or opacity.

Relating to the movement of the document M1 (between the light source 118 and the cell 116), it may be seen that the line 23 is scanned to provide an analog signal A, an illustrative form of which is represented by the curve 30 in FIG. 2. The analog signal A is provided from an output line 120 to a signal processor 122 for amplification and refinement. From the signal processor 122, the resulting analog signal A is sampled, digitized and stored for recording. The operations are sequenced by a series of timing signals provided from the card transport and pulse generator 104. Note that space displacement of the document M1 is directly related to the time base of the observed signal, e.g. the curve 30.

From the signal processor 122, the sensed analog A is supplied to a selector gate 124 which is also connected to the card transport and pulse generator 104. The selector gate 124 samples the analog signal, passing values to an analog-digital converter 144. The selector gate 124 actually senses the analog signal to provide signals indicative of the characteristic at the individual pixel locations 26 (FIG. 2).

The sample signals representative of pixel locations 26 are converted to digital-format signals CH by a converter 144 and supplied through a buffer storage 148 to a register 150. The register 150 is coupled to an encoder 152 for supplying an encoded signal EN to a printer 154 that receives document M1 from the roller pair 108. The printer applies a representation of the signal EN as the designation 19 (FIG. 1) on the document M1. Thus, the designation 19 is indicative of the observed uniqueness characteristic. As disclosed in detail in the related patent, the characteristic may be variously coded.

In view of the above structural description of the system of FIG. 3, a complete understanding of the operation may now be perfected by explaining the sequence for processing a document M1 (FIG. 1) into a processed document M2. Accordingly, assume that a raw document M1 is provided to the roller pair 106 with the result that the roller pair is automatically actuated and driven by the transport and generator 104 to advance the document M1 under the line sensor 112. As a result, the start bar 34 (FIG. 2) is detected to indicate the critical position of the document M1. As the document M1 continues to move, it is scan sensed by the characteristic sensor 114 to move the analog signal as illustrated in FIG. 2 by the curve 30.

As the document M1 moves under the characteristic sensor 114, the roller pairs 106 and 108 (coupled to the generator 104) indicate tne displacement of the document as data for the generator 104 to provide clock pulses C and timing pulses t. The clock pulses C are applied to the selector gate 124 to command sampling. A timing signal t1 defines the quiescent state and a signal t2 defines the initial interval of operation.

When the line sensor 112 senses the start bar 34, the timing signal t2 actuates the characteristic sensor 114 for observing the document translucency as a uniqueness characteristic. Accordingly, the analog signal representative of the characteristic is provided through the conductor 120 to the signal processor 122 which is also actuated by the signal t2.

The selector gate 124 is also actuated by the signal t2 and during the interval when the analog is provided, clocking pulses C actuate the selector gate to sample the analog signal providing samples through the conductor 142 to the analog-digital converter 144 for sequential conversion and storage in the buffer register 148.

In accordance with the disclosed embodiment, the translucency pattern is sensed in fifteen sections 24 (FIG. 2) each including five pixel locations 26. Accordingly, seventy-five pixel locations are sensed, sampled, converted to digital values represented by the signal CH and registered in the buffer storage 148 during the interval of the timing signal t2. The sequence occurs during the timing signal t2. The timing signal t2 halts when the document M1 has cleared the roller pair 108 to be received by the printer 154.

The timing signal t3 is initiated immediately after the signal t2. During the interval of timing signal t3, the digital characteristic values are moved from the buffer storage 148 into the register 150. Thereafter, during the timing interval t4, the encoder 152 encrypts the digital characteristic signals CH setting the resultant signals EN in a register 153.

With the encrypted value registered in the register 153, the system enters the phase of timing signal t5 during which the register 153 supplies the signal EN to the printer 154 to specify the designation 19 for printing on the document M2 (FIG. 1). The printer 154 is active during the interval of the timing signal t5 and upon conclusion of the printing, the printer signals the generator 104 to return to the quiescent state during which the signal t1 is provided. Thus, a raw document M1 is transformed into a processed document M2.

In the usual operations attendant the disclosed embodiment, documents will be processed to the state of the document M2 by volume methods. For example, with regard to an illustrative document in the form of a check or money order, processed documents M2 might be distributed to sales locations for individual processing to receive value designations and issuance data so as to be completed in the form of final documents M3 (FIG. 1).

In an exemplary use of the system hereof, processing devices would be provided at the locations of issuing and redeeming money orders. Alternatively, issuing locations could function without processing equipment in a limited embodiment of the system. In a simple operation it is only necessary to print the bar designations 22 and the value designation 21 on the document M3 (FIG. 1). Such operations could be performed manually. However, it is contemplated that a more typical system would involve the use of a processor at each station so that both printing and verification operations could be performed.

As indicated above, the bar designations 22 are placed in accordance with a code to manifest specific values. In that regard, the code is based on the use of five sections 24 (FIG. 2) for each decimal digit. As indicated in FIG. 2, the first five sections 24 indicate the first digit, the second five the second digit, and the third five the third digit. As a further specification, the code provides that two bar designations 22 be present in each digit area for another confirmation test. An exemplary code for the designations is:

| | |
|---|---|
| 0 | 00011 |
| 1 | 00101 |
| 2 | 00110 |
| 3 | 01001 |
| 4 | 01010 |
| 5 | 01100 |
| 6 | 10001 |
| 7 | 10010 |
| 8 | 10110 |
| 9 | 11000 |

Considering an example of the code, note that the represented bar designations 22 in FIG. 2 are:

| Area | Code | Decimal |
|---|---|---|
| First digit | 01001 | 3 |
| Second digit | 10001 | 6 |
| Third digit | 01010 | 4 |

Figure 4:
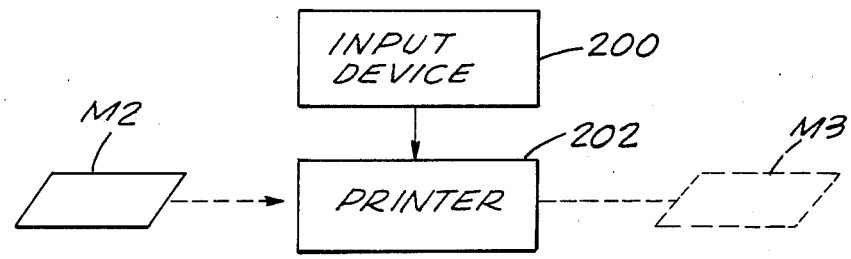
FIG. 4 is a block diagram of an apparatus for issuing a document as illustrated in FIG. 1.

Thus, the designated value is $364.00. The bar designated value accordingly coincides to the Arabic value designation 21. A printer for these designations may utilize well known signal controlled printer techniques. Accordingly, the printer component of the processor may be simply as illustrated in FIG. 4.

An input device 200 allows an operator to form command signals indicative of the values to be designed. Such values are supplied to a printer 202 incorporating bar and numeral type. The printer 202 receives and prints the documents M2 with the bar designations 22 and the value designation 21 delivering a completed document M3.

The final documents M3 may be delivered to holders as financial documents. In accordance herewith, security is accomplished by sensing the block 16 (FIG. 2) for verification. Specifically, the bar designations 18 are sensed to confirm the value designation. The pixel areas 26 are selectively tested to authenticate the document and to verify that the document has not been altered. In accordance with the disclosed embodiment, the test involves translucency as the uniqueness characteristic as well as the value data code verification, i.e. two bar designations 22 per digit section. The exemplary form of apparatus for testing the document will now be described with reference to FIG. 5.

The document M3 (FIG. 5 central) is to be tested and verified by the system. The document M3 is received by a card sensor 210 having the capability to read the document M3 in several aspects. The sensor 210 embodies a uniqueness characteristic sensor as described above with reference to FIG. 3 along with optical readers as well known. The card sensor provides several distinct signals read from the document M3. Specifically, clock pulses C, a fresh sensing of the uniqueness characteristic in the from of signal CH', the encrypted signal EN read from the designation 19, and an Arabic numeral signal AN read from the designation 21.

The clock signals C are applied through a signal processor 212 to a scale-of-five unit 238. As explained above, the clock signals C relate to the displacement of the document M3 within the card sensor 210 and are sequenced to designate the individual pixel locations 26. Thus, the card sensor 210 reads the pixel locations 26 to provide a fresh analog signal as disclosed with reference to FIG. 3. The analog signal is provided to a signal processor 214. The sensor 210 supplies the encoded signals EN to a decoder 216. Finally, the sensor 210 supplies the Arabic designation signals AN to a value comparator 218.

Generally, the function of the apparatus of FIG. 5 involves the selective comparison of pixel location characteristic values as freshly sensed (signal CH') and as previously sensed and recorded (signal CH). Note that the comparison is selective, omitting any set of five pixel locations 26 which lie in a section 24 with a bar designation 22 (FIG. 2). This selective testing is illustrated in FIG. 2 as explained above with regard to the fifteen segments of the curve 30.

The translucency characteristic of the present invention is sensed as a fresh analog signal A' as explained with reference to FIG. 3. Such signal is provided from the analog signal processor 214 (FIG. 5) to a sampling gate 222 controlled by clock signals C. The resulting samples from the gate 222 are translated to digital signals CH' by a converter 224 and stored by sets of five in a storage 226. Accordingly, signals representative of five pixel areas (FIG. 2) within a section 24 are placed in storage 226 pending a determination of whether the specific section 24 also contains a bar designation 22. If a bar designation is present, the values representative of five pixel areas are ignored. Alternatively, if no bar designation is present in the section 24 the characteristic signals representative of the five pixel areas are passed through a gate 228 for selected comparison with the recorded reference characteristic value. Thus, the signals CH' (freshly sensed) are compared with the decoded reference signals CH. Again, the selective comparison depends on the absence of a value representing bar designation 22.

The presence of bar designations 22 is sensed from the analog signal A as provided from the signal processor 214. Specifically, a peak detector 234 receives the analog signal A to sense the negative-going excursions or spikes 36 as illustrated in FIG. 2. With the occurrence of a spike 36, a bar designation 22 is manifest producing a signal to set a binary 236 (FIG. 5). Essentially, if the binary 236 is set any time during the signal A manifesting a particular section 24 (FIG. 2), the resulting signals are ignored by the gate 228 (FIG. 5) being closed. With the termination of each section 24, the binary 236 is reset. Specifically, the binary 236 is connected to the scale-of-five unit 238 for clearance with each fresh set of five pixel location signals defining a section 24.

The scale-of-five unit 238 is also connected to the inhibit gate 228. Accordingly, if the inhibit gate 228 receives a signal from the binary 236, the signals in the storage 226 are blocked. Otherwise, upon receipt of a signal from the scale-of-five unit 238, the inhibit gate 228 passes a set of five characteristic value signals CH' to the selective comparator 230. Accordingly, in sequence, the comparator 230 receives signals CH and CH' manifesting sets of five pixel values.

As there are seventy-five pixel values in all, thirty pixel values are to be ignored. The characteristic sensor receives nine sets of five pixel values for comparison with similar values provided from the decoder 216. In that regard, decoder 216 is connected to the comparator 230 through a line 235. As disclosed in the referenced U.S. Pat. No. 4,423,415, various techniques may be utilized for establishing the requisite degree of comparison to provide an approval signal at a line 237. In any event, upon obtaining the desired degree of similarity between the selected portions of the signals CH and CH', an approval signal W is applied in the line 237 from the comparator 230.

During an interval when the inhibit gate 228 blocks signals CH' from the comparator 230, the bar decoder 240 receives an indication from the peak detector 234. In that regard, the bar decoder is connected to receive the clock signal C, counting to define the sections 24. Of course, the sequence and position of the peak signals indicate the bar designations 22 and a designated value for the document M3. Accordingly, the bar decoder 240 provides signals representative of such value to a read-out unit 242 for manifesting the value as indicated by the bar code. The decoder performs two simple logic operations, i.e. (1) testing the propriety of the bar code with exactly two bar designations 22 for each digit and (2) decoding the two bar designations in accordance with the above binary code format. If the bar code is proper (two designations 22 per digit) a binary signal is supplied to qualify an "and" gate 245 (lower left).

If the code is proper, the value is decoded. Accordingly, the value indicated by the bar code is represented by signals from the decoder 240 to be compared with the value as designated on the document in Arabic numerals read as the signal AN. Specifically, signals from the bar decoder 240 are supplied to the value comparator 218 for a test comparison. If comparison occurs it is manifest by a signal in a line 224 to fully qualify the gate 245 providing an approve signal in a line 247. The signals in the lines 237 and 247 can be employed to indicate various forms of approval.

Recapitulating to some extent, the authentication of a document M3 involves interrelated tests. Essentially, the uniqueness characteristic as previously sensed and recorded is tested against the uniqueness characteristic as freshly sensed. The test not only verifies the authenticity of the document but in accordance herewith further authenticates the fact that the document has not been modified. To further verify lack of modification, the indicia applied to the document (bar code) is also tested with respect to: the code format, a comparison, and the coded value indications. Such tests afford considerable reliability for documents as in the form of money orders at the time of redemption.

As will be readily apparent from the above illustrative embodiments, the system hereof is susceptible to a great number of modifications and deviations within the basic conceptual framework as disclosed. Accordingly, the scope hereof is deemed to be as set forth in the claims below.

What is claimed is:

1. A method of issuing secure documents with specific designations, as related to value, comprising the steps of:

selecting a sheet for a raw document having a uniqueness characteristic in at least a specific area sensitive to change, as by erasure;

sensing said uniqueness characteristic at said specific area in the form of data;

recording indicia on said raw document for indicating said uniqueness characteristic as sensed;

printing blocking code designations on said raw document to indicate a specific value therefor, said designations being located within said specific area such as to leave portions of said area unaltered for sensing to authenticate the document; and printing value designations on said raw document indicating said specific value.

2. A method according to claim 1 wherein said step of printing code designations on said raw document designates at least one portion of said specific area to be invalid in the authentication of the document.

3. A method according to claim 2 further including the step of selectively testing portions of said specific area not designated to be invalid against a record of said uniqueness characteristic as indicated by said recorded indicia.

4. A method according to claim 1 wherein said sheet is selected to have an inherent uniqueness characteristic.

5. A method according to claim 1 wherein said sensing comprises passing light through said sheet.

6. A method according to claim 1 wherein said step of printing code designations comprises indexing said area to define distinct digit areas and printing said code designations in select digit areas.

7. A system for processing secure documents with specific designations as related to value, such documents having an anticounterfeit uniqueness characteristic, the system comprising:

means for indexing an area of said card having said uniqueness characteristic to define an array of pixel locations in said area, and further to define said pixel locations in groups;

means for receiving reference signals representative of said uniqueness characteristic at said pixel locations;

means for sensing said pixel locations to provide sensed signals representative of said uniqueness characteristic and blocking indicia for any of said groups; and means for selectively testing said reference signals against said sensed signals excluding any of said groups indicated to contain blocking indicia.

8. A system according to claim 7 wherein said documents carry blocking indicia, said system further including means for sensing said blocking indicia to manifest values.

9. A system according to claim 8 wherein said documents carry machine-readable value designations, said system further including means for reading said value designations and means for comparing signals representative of said value designations with signals representative of said blocking indicia.

10. A system according to claim 7 wherein said means for sensing comprises means for sensing the translucency of said documents.

11. A system according to claim 7 wherein said means for indexing includes clocking means.

12. A system according to claim 7 wherein said means for selectively testing includes means for testing the bar code format and decoding bar codes.

* * * * *